United States Patent

Puglia et al.

[11] Patent Number: 6,087,972
[45] Date of Patent: Jul. 11, 2000

[54] MICROWAVE SENSOR FOR OBJECT MOTION DETECTION

[75] Inventors: Kenneth Puglia, Westford, Mass.; Dirk Steinbuch, Bergrheinfeld; Hermann Henftling, Mainstockheim, both of Germany

[73] Assignee: The Whitaker Corporation, Wilmington, Del.

[21] Appl. No.: 09/252,423

[22] Filed: Feb. 18, 1999

Related U.S. Application Data

[60] Provisional application No. 60/076,915, Mar. 5, 1998.

[51] Int. Cl.[7] ............................. G01S 13/56; G01S 13/04
[52] U.S. Cl. ............................. 342/28; 342/27; 342/175; 342/194; 342/195
[58] Field of Search ............................. 342/27, 28, 149, 342/150–154, 160–164, 194, 195, 175

[56] References Cited

U.S. PATENT DOCUMENTS 4,616,228  10/1986  Giaccari et al. ........................ 342/160

FOREIGN PATENT DOCUMENTS 2166311  4/1986  United Kingdom ................... 342/194

*Primary Examiner*—Bernarr E. Gregory

[57] ABSTRACT

A microwave sensor for determining the velocity and direction of a moving object comprises a mixer, phase shifter, and receive/transmit antenna mounted in series, the mixer having a single intermediate frequency output. The intermediate frequency output is switched synchronously with the phase shifter which is switched between 0° phase shift and 45° phase shift. Although the mixer has only a single intermediate frequency output, the switching provides two output channel signals and with a phase difference of 90° therebetween to enable determination of the direction of movement. The single intermediate frequency channel provides intrinsic gain matching of the output channels which eliminates the need for tuning in order to balance output channels as required in conventional sensor.

10 Claims, 4 Drawing Sheets

MICROWAVE SENSOR FOR OBJECT MOTION DETECTION

This application claims benefit of provisional application Ser. No. 60/076,915 filed Mar. 5, 1998.

BACKGROUND OF THE INVENTION

1. Field of the Invention

This invention relates to a microwave sensor for detecting the presence of an object, and in particular a moving object.

2. Description of the Prior Art

Microwave sensors for detecting the presence of moving objects, and the direction of movement, are found in a variety of applications such as door openers, security systems, and toilet flushers. Such microwave sensor typically comprise a high frequency (or radio frequency) "RF" circuit comprising an oscillator for generating a high frequency oscillating signal, an antenna or antennas for transmitting and receiving the oscillating signal, and a mixer for modulating the oscillator signal with the received signal. In order to determine the direction of motion of an object, the oscillator signal is mixed with the receive signal to generate two output intermediate frequencies "IF" with 90° phase difference, the combination of which determines the direction of movement of an object toward or away from the sensor. The velocity may be determined from either IF which both comprise the Doppler frequency component.

The RF circuit in microstrip outlay of a known microwave sensor is illustrated in FIG. 1. The RF circuit 102 of the known sensor comprises an oscillator 104, a transmission line 106, an antenna 108 for transmitting and receiving the microwave signals generated by the oscillator, and first and second mixer diodes 110, 112 respectively that are connected to the transmission line 106 at a spacing from each other corresponding to $1/8^{th}$ of the wavelength of the oscillator signal. The $1/8^{th}$ wavelength separation of the mixer diodes 110, 112 corresponds to a phase shift of 45°. The oscillator power LO1 arriving at the first mixer diode 110 (D1) mixes with a receive signal (RF1) resulting from reflection of transmitter power off an object and received by the antenna 108. Similarly, oscillator power LO2 at the second mixer diode 112 (D2) mixes with a receive signal (RF2). Because the signals LO1 and LO2 have a phase difference of 45°, and the receive signals RF1 and RF2 have a phase difference of −45°, overall the output intermediate frequency signals IF1 and IF2 have a phase difference of 90°. One of the problems of this known arrangement, is that the power of the oscillator signals LO1 and LO2 may not be identical in view of losses along the transmission line, or due to varying characteristics of the diodes 110, 112. Similarly, the power of the receive signal RF2 may differ slightly from RF1 such that the outputs IF1 and IF2 differ. Power and diode variations also cause a relative phase shift of the signals IF1 and IF2. In order to process the signals IF1 and IF2 in view of determining the direction of motion or computing the velocity, the outputs IF1 and IF2 need to remain within certain tolerances. In prior constructions, it is often necessary to manually tune the sensor to compensate for the unequal power divisions and phase differences in the separate mixer diodes.

It would be desirable to improve the reliability of signal processing and reduce or avoid the need for tuning.

SUMMARY OF THE INVENTION

Objects of this invention have been achieved by providing the sensor according to claim 1. Disclosed herein is a microwave sensor comprising an oscillating power source to generate an oscillating signal, one or more antennas for transmitting oscillating signals generated by the oscillator and detecting return signals reflected off an object in motion to be detected, a phase shifter for providing output intermediate frequency (IF) signals with a phase difference of 90°, and a mixer for mixing signals of the oscillator with return signals received by the sensor, wherein the intermediate frequencies outputted by the mixer are switched synchronously with switching of the phase shifter from such that a single mixer processes both output intermediate frequencies (IF1, IF2).

Further advantageous aspects of this invention are set forth in the claims, or will be apparent from the following description and drawings.

DETAILED DESCRIPTION OF THE PREFERRED EMBODIMENT

Figure 2:
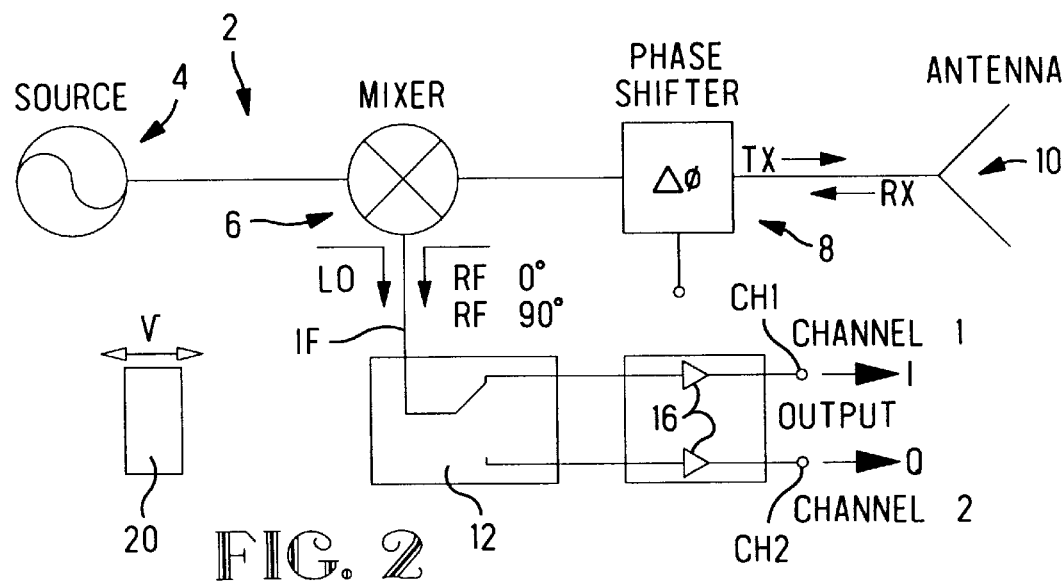
FIG. 2 is a block diagram of a sensor according to this invention.
Figure 3:
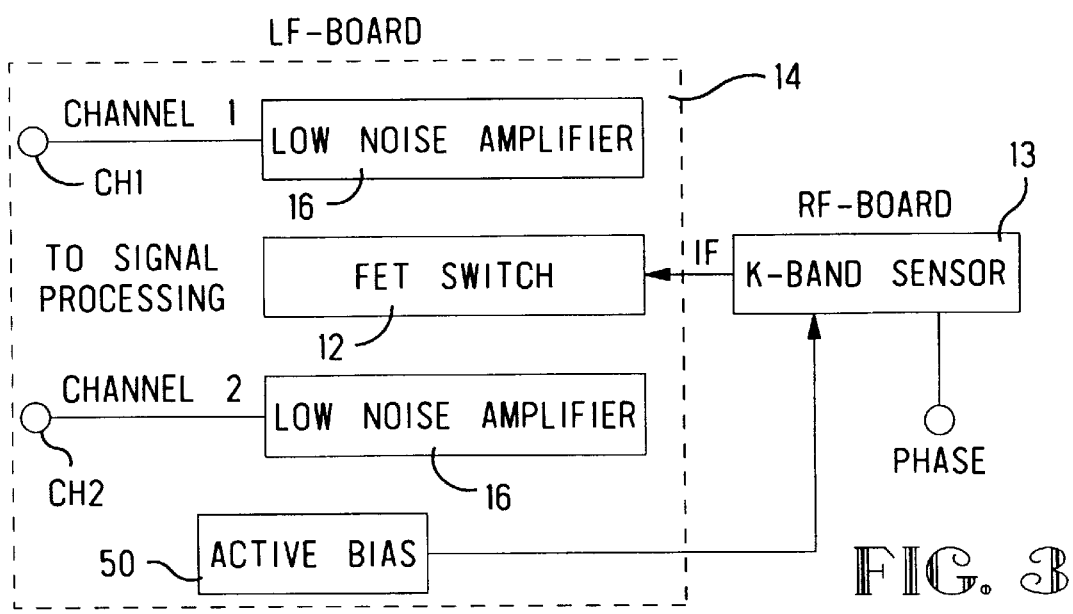
FIG. 3 is a block diagram in simplified form to show the architecture of the sensor with a high frequency (RF) board interconnected to a low frequency (LF) board.

Referring firstly to FIG. 2, the sensor 2 comprises a source oscillator 4, a mixer 6, a phase shifter 8, an antenna 10 and pair of sensor output channels CH1 (or I) and CH2 (or Q). The output of the mixer is defined as an intermediate frequency (IF), and as best seen in FIG. 3, the intermediate frequency (IF) is switched by a field effect transistor (FET) switch on the low frequency board to produce the channel 1 (CH1) and channel 2 (CH2) output signals of the sensor. The output signals (I, Q) are doppler frequencies, with 90° phase difference such that both velocity and direction of motion can be determined therefrom.

The sensor LF circuit is provided with a low noise amplifier (16) for each output channel in order to preamplify the IF outputted by the RF circuit, thereby improving the reliability of transmission and signed to noise ratio of the output signal to be further processed by the user.

The phase shifter 8 is switched synchronously with the FET switch 12 such that the signal at the output of channel 1 (CH1) corresponds to a first phase-shift state and the second output signal at the second channel (CH2) to a second phase-shift state. A transmitted signal TX produced by the source oscillator 4 passes through the phase shifter 8 which may take one of the two states, the first state performing no phase shift (i.e. 0°) and the second state performing a phase shift $\Delta\Phi$ equal to 45°. The transmit signal emitted by the antenna 10 reflects off an object 20 which may be in motion with velocity (V) towards or away from the sensor (in relative terms), a portion of the reflected signal RX captured by the antenna 10 and shifted a further 45° by the phase shifter 8 before arriving at the mixer 6. The reflected signal (RF) arriving at the mixer may thus either have a 0° phase shift or a 90° phase shift. The reflected signals (RF) will have a slight frequency shift (Doppler frequency shift) after reflection if the object 20 is in motion relative to the sensor. The reflected signal (RF) is mixed with oscillator signals (LO) from the source oscillator 4 to provide the intermediate frequency (IF) that comprises the doppler frequency. The IF may be processed by a user to determine the velocity of the object 20.

Figure 1:
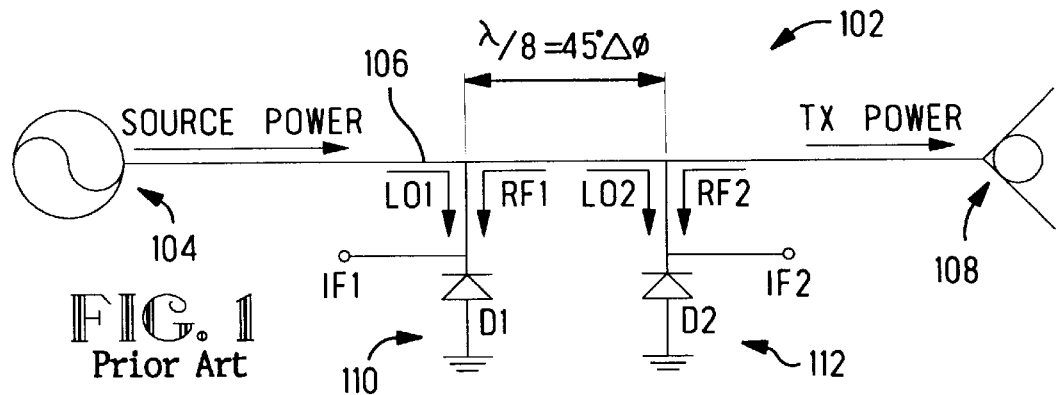
FIG. 1 is a simplified RF circuit of a conventional microwave motion detection and direction sensor.

The FET switch 12, operates synchronously with the phase shifter such that the signal output (I) at channel 1 (CH1) corresponds to an intermediate frequency with 0° phase shift and the output (Q) at channel 2 (CH2) corresponds to an intermediate frequency with 90° phase shift. The output signals (I, Q) may be held ("sample and hold") such that a device having two intermediate frequency channels (such as conventional devices described according to FIG. 1) is simulated. While either channel (CH1, CH2) may be used for determining the velocity (V) of the object 20, the signals (I, Q) of channels (CH1, CH2) respectively may be combined to determine the direction of motion of the object 20 towards or away from the sensor 2.

Because the mixer has only a single intermediate frequency (IF) which is subsequently switched to produce the output signals (I, Q) at quadrature, there is intrinsic gain matching between the outputs signals (I, Q) thus eliminating the need for tuning the sensor in order to balance the outputs.

Figure 4:
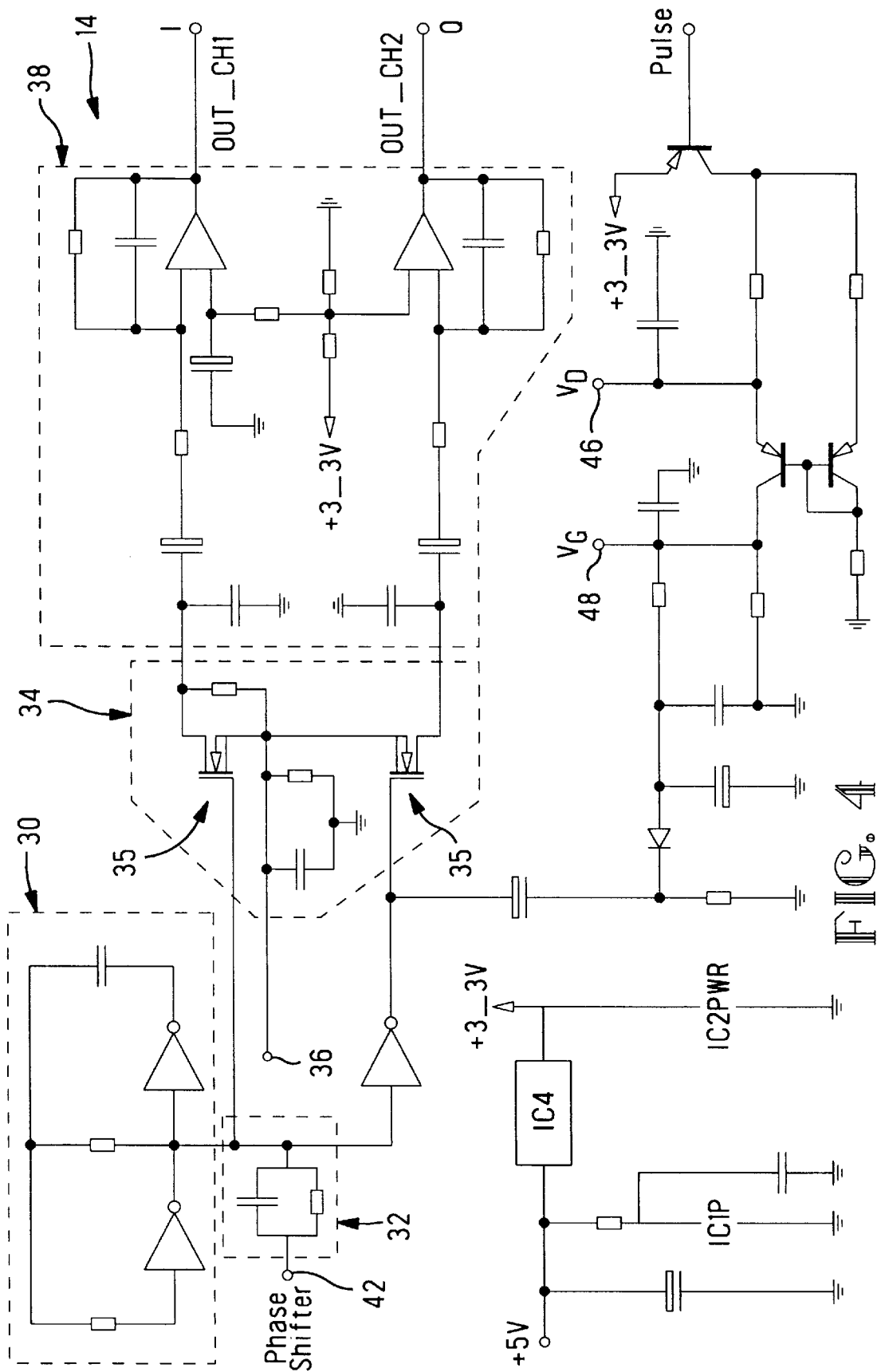
FIG. 4 is the electrical schema of the low frequency board.

Referring now to FIG. 4, the low frequency circuitry 14 is shown comprising a clock 30, which in this embodiments operates at 210 kHz, connected to a phase shifter circuit 32 and a switching circuit 34 with FET switches 35 that switches the IF output 36 of the mixer 6 into the separate output channels (CH1, CH2). Prior to output, the output signals (I, Q) are amplified by a low frequency amplifier 38, which in this embodiment has a 40 dB gain and operates in a range of 5 Hz to 1 kHz. The intermediate frequency (IF) output of the mixer is in effect a Doppler signal whereby each 44 Hz corresponds to 1 Km/h. The channels CH1, CH2 of the low frequency board can be connected to signal processing equipment of the user for determining the velocity of the object 20 with respect to the sensor (either signal I, Q can be used, or both to increase reliability) whereas the signals I, Q at quadrature are both used to determine the direction of motion of the object in the known manner. The phase shifter 32, which operates synchronously with the switching circuitry 34, has a connection 42 to the (RF) board (see FIGS. 4 and 5). The (RF) circuit 13 has an intermediate frequency (IF) connection point 36 that is electrically connected to the intermediate frequency point 36 of the low frequency circuit 14. The LF circuit 14 further comprises an active voltage bias 50 comprising a drain voltage connection ($V_D$) and a gate voltage connection ($V_G$) 46, 48 respectively connected to drain voltage and gate voltage connections 46, 48 on the RF circuit 13 (see FIG. 5). The power supply to the oscillator 4 (shown in FIG. 5) is actively controlled by the voltage bias of the drain 46 and gate 48 of the LF circuit 14.

Figure 5:
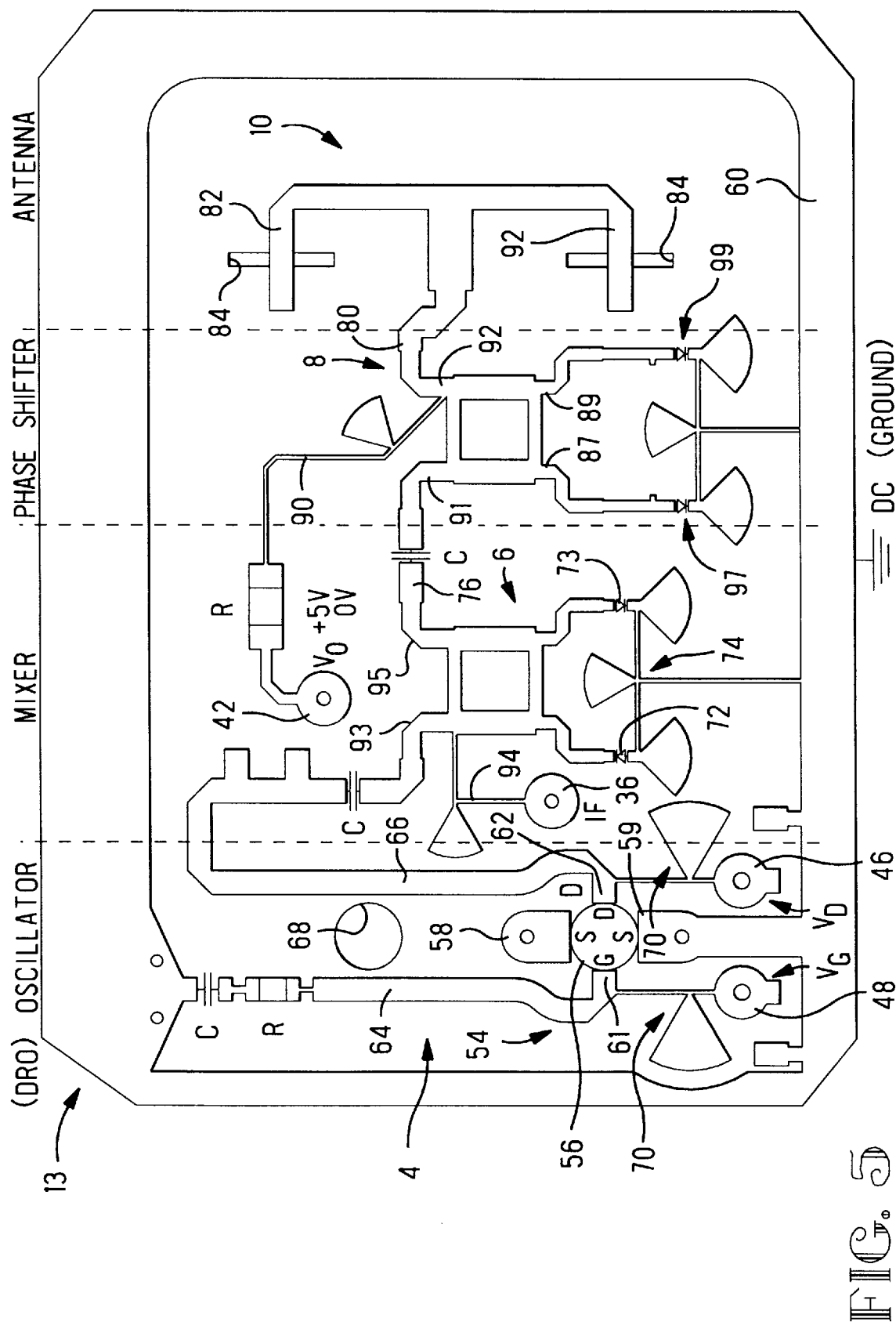
FIG. 5 is the electrical layout of the RF board.

Referring to FIG. 5, the oscillator 4 is a dielectric resonance oscillator (DRO) comprising a field effect transistor (FET) 54. The FET 54 comprises a semi-conductor 56 having sources 58, 59 connected to direct current (DC) ground 60, and where the gate and drain 61, 62 respectively are connected to the connection points 48, 46 respectively to the LF circuit. The drain is adjusted to three volts whereas a voltage applied across the gate and source 61, 58, 59 produces white noise fed into the 50 ohm line 64 of the DRO 4.

A ceramic puck 68 with a high dielectric constant is positioned between the 50 ohm lines 64, 66 of the gate and drain respectively and is adjusted to amplify the oscillator signal, which in this embodiment is at 24 GHz. It may be noted that the connection points 46, 48 of the drain and gate are connected to the DRO 4 via high impedance lines 70 that block the narrow band 24 GHz oscillator signal from exiting through the connection 46, 48.

The mixer 6 which is implemented as a balanced mixer using a quadrature hybrid, is connected to DC ground via the mixer diodes 72, 73, and high impedance lines 74 to prevent losses of the high frequency signal to ground. The mixer 6 is interconnected via the RF port 95 and transmission line 76 to a first port 91 of the phase shifter 8 which is connected via a second port 92 and transmission line 80 to an antenna 10, which in this embodiment is an Aperture Coupled Patch antenna comprising a pair of transmission line ends 82 traversing slots (i.e. apertures) 84 in a ground plane 86 (see FIG. 6). The slots 84 couple the transmission line ends 82 to antenna patches 86 through dielectric 88. The latter arrangement thus forms a patch antenna with two patches, however it is also possible to provide a single patch or a plurality of patches greater than two, depending on the shape of the antenna transmit and receive field that is desired. It is also possible to separate the transmit and receive antennas, however it is convenient in this invention to use the same antenna for transmission and reception.

The phase shifter 8 which is implemented using a quadrature or branchline hybrid, is coupled at the port 92 to the phase shifter switch connection point 42 via a high impedance line 90 (with respect to the oscillator frequency—in this case 24 GHz plus or minus a certain tolerance) The phase shifter voltage ($V_\Phi$) is switched between 0 volts and 5 volts thereby changing the voltage bias of the phase shifter between 0 volts and 5 volts at the port 92 on the transmission line. The two other ports 87, 89 of the phase shifter are connected to PIN diodes functioning as varactor diodes 97, 99 that have capacitance values depending on the voltage bias of the phase shifter. The voltage bias changes the capacitance of the varactor diodes 97, 99 and thereby their reflection coefficients, which determine the phase shift of the reflected signal. The reflection coefficients are adjusted, taking account of the branchline hybrid, to perform a phase shift of 0° or 45° depending on the voltage bias of 0V or 5V. As the diodes 97, 99 reflect the incident signal of the input port (91 or 92 depending on whether the signal is a transmit or receive signal) the shift in phase of the transmit and receive signals flowing through the phase shifter are each either 0° or 45°. The RF signal outputted by the phase shifter 8 and received by the mixer 6 thus has an overall phase shift of either 0° or 90°.

Signals (RF) received from the antenna, after passing through the phase shifter and mixed with signals (LO) from the oscillator at the mixer, are provided to the low frequency board 14 through the IF connection point 36 that is connected to the mixer via a high impedance line 94. The high impedance line 94 blocks high frequency oscillator (LO) and receive (RF) signals from escaping into the low frequency circuit through the IF connection 36, but allows substantially only the lower frequency ($f_{doppler}$) doppler signal to enter the LF circuit 14. The doppler signal is the differential signal with frequency $f_{doppler}=f_{LO}-f_{RF}$ resulting from mixing of the oscillator signal (LO) and slight frequency shifted receive (RF) signal (resulting from reflection off a moving object).

Figure 6:
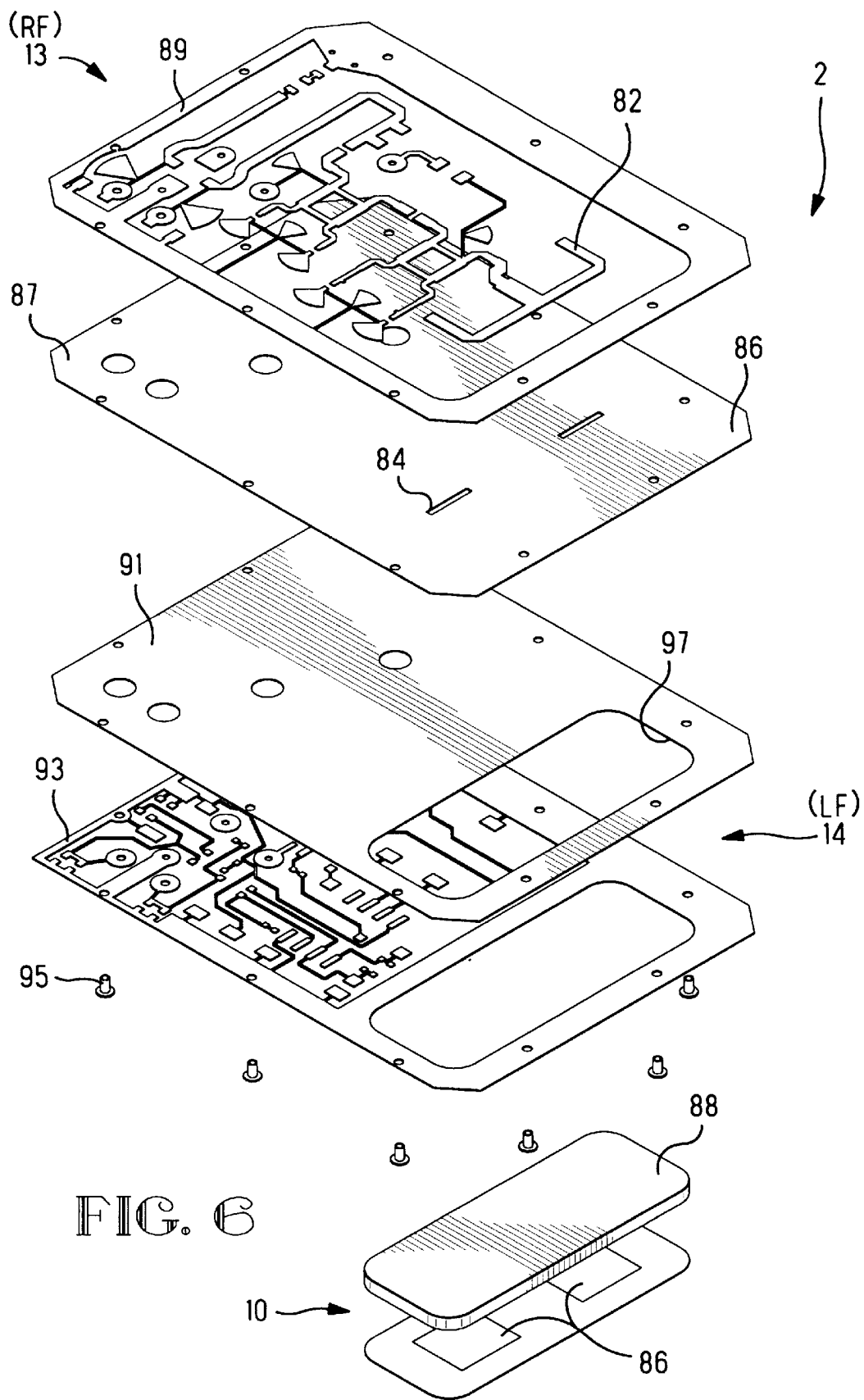
FIG. 6 is an isometric exploded view illustrating the sensor comprising the LF and RF boards and antennas.

Referring to FIG. 6, the construction of the sensor 2 is illustrated, comprising the RF board 13 with a substrate support 87 having a ground plane 86 (i.e. covered with a conductive material) on an underside thereof and conductive circuit traces 89 of the RF circuitry on an upper side thereof, the ground plane and RF circuitry deposited on the substrate 87 by any conventional means. The LF board 14 may be in the form of a substantially conventional printed circuit board comprising a substrate 91 having conductive circuit traces 93 on an underside thereof and mounted against the RF board 13 adjacent the upper side of the LF substrate 91. In order to interconnect the connection points 46, 48, 42, 36 and DC between the LF circuit and RF circuit, conductive rivets or eyelets 95 may be provided, or alternatively conductive through holes in the boards 91, 87 that may be subsequently soldered for improved electrical interconnection. The eyelets 95 may also be used to secure the RF and LF boards together.

The LF board may be provided with a cutout 97 for mounting the antenna patches and dielectric 86, 88 therein for coupling to the RF antenna branches 82 via the slots 84 in the ground plane 86.

We claim:

1. A motion sensor, comprising:

an oscillator to generate an oscillating signal;

an antenna to transmit said oscillating signal and to receive a return signal;

a phase shifter to alternate between generating a first phase shift signal and a second phase shift signal using said return signal;

a mixer to mix said oscillating signal with said first phase shift signal and said second phase shift signal to generate a first intermediate frequency signal and a second intermediate signal, respectively; and a switch to output said first intermediate signal when said first phase shift signal is generated, and said second intermediate signal when said second phase shift signal is generated.

2. The motion sensor of claim 1, wherein said first phase shift signal has a first phase state and said second phase shift signal has a second phase state.

3. The motion sensor of claim 2, wherein said first phase state is 0 degree and said second phase state is 45 degrees.

4. The motion sensor of claim 1, wherein said first intermediate frequency signal has a phase difference of 90 degrees from said second intermediate frequency signal.

5. The motion sensor of claim 1, wherein said phase shifter is mounted in electrical series between said mixer and said antenna.

6. The motion sensor of claim 1, wherein said antenna is an aperture coupled patch antenna.

7. The motion sensor of claim 1, wherein said oscillator is a dielectric resonance oscillator.

8. The motion sensor of claim 1, wherein said mixer is a quadrature hybrid balanced mixer connected to a low frequency circuit.

9. The motion sensor of claim 1, wherein said switch is a field effect transistor switch.

10. The motion sensor of claim 1, further comprising a low frequency amplifier to amplify said first intermediate frequency signal and said second intermediate frequency signal prior to output.

\* \* \* \* \*